United States Patent [19]

Hasenfratz et al.

[11] Patent Number: 5,597,500
[45] Date of Patent: Jan. 28, 1997

[54] CONTAINER APPARATUS FOR FOOD

[75] Inventors: Rene Hasenfratz, Eschlikon, Switzerland; Siegfried Mutschler, Blaustein, Germany

[73] Assignee: Spring AG Metallwarenfabrik Eschlikon, Switzerland

[21] Appl. No.: 356,328

[22] PCT Filed: Apr. 20, 1994

[86] PCT No.: PCT/CH94/00078

§ 371 Date: Mar. 29, 1995

§ 102(e) Date: Mar. 29, 1995

[87] PCT Pub. No.: WO94/23629

PCT Pub. Date: Oct. 27, 1994

[30] Foreign Application Priority Data

Apr. 21, 1993 [CH] Switzerland .............. 1210/93

[51] Int. Cl.⁶ .............. H05B 3/06; B65D 43/14
[52] U.S. Cl. .............. 219/385; 219/386; 220/252
[58] Field of Search .............. 219/385, 218, 219/391, 392, 399, 429, 430, 432, 433, 435, 438, 439, 386; 99/380, 482, 483; 220/252; 126/21 A, 21 R, 24, 25 AA, 25 R; 312/223.6

[56] References Cited

U.S. PATENT DOCUMENTS

| 78,366 | 5/1868 | Fenn | 220/252 |
| 284,532 | 10/1883 | Berry | 220/252 |
| D. 365,724 | 1/1996 | Yu | 7/355 |
| 931,497 | 8/1909 | Schille | 220/252 |
| 2,678,992 | 10/1953 | Koch | 219/434 |
| 3,167,642 | 7/1961 | Reis | 126/25 R |
| 4,320,849 | 3/1982 | Yellin | 220/252 |
| 5,131,779 | 7/1992 | Sen | 16/342 |
| 5,203,257 | 4/1993 | Goad | 99/483 |
| 5,453,596 | 9/1995 | Verreniotis | 219/433 |
| 5,485,693 | 1/1996 | Frenken et al. | 16/365 |

FOREIGN PATENT DOCUMENTS 2245162  2/1992  United Kingdom .............. 312/223.6

Primary Examiner—Teresa J. Walberg
Assistant Examiner—J. Pelham
Attorney, Agent, or Firm—Diller, Ramik & Wight, PC

[57] ABSTRACT

An apparatus for food includes a receptacle supported a frame with the receptacle being heated by a resistance heater from a supply of energy over an electric line, the receptacle and frame include means pivotally securing the same for each other, the pivotal securing means including at least one supporting pin having a side opening groove for laterally receiving and hooking the electric line therein thereby guiding the electric line through the supporting pin.

10 Claims, 3 Drawing Sheets

CONTAINER APPARATUS FOR FOOD

BACKGROUND OF THE INVENTION

The invention relates to a container apparatus for food, with a receptacle supported by a frame intended for a direct or indirect receipt of a food, and with a line for the supply of energy, which at the one end extends away from the apparatus and at the other end is mounted to the base of the receptacle for the transmittal of energy.

The container apparatus is designed according to common practice as temperature holding apparatus and an electric cable serves for the supply of energy, whereby a heating device is mounted at the outer side of the bottom of the receptacle. Basically, however, the container apparatus could also serve for a cooling of food, whereby in such case a cooling device would be mounted at the outer side of the bottom of the receptacle. However, also a gas could be used for the energy supply. Below, the container apparatus shall be described as temperature holding apparatus. As is common practice the electric cable extends in a disorderly way, loosely from the outer side of the bottom of the container hanging downwards and freely away from the container apparatus. This is not esthetical and specifically unsuitable when the container apparatus is provided with a tilting lid. In the latter case the tilting lid is tilted in such a manner into its opened position that it is pivoted away from the guest. This means that the guest passes along the opened container apparatus and helps himself to the food. When the e.g. hemispherical tilting lid has been opened in this way completely, it pivots through under the receptacle-in the direction to the guest. At mentioned disorderly, i.e. not guided state of the electric cable, this means that the electric cable comes to lie between the inner wall of the lid and mentioned heating device at the bottom of the receptacle and hangs towards the outside at the rim of the lid and specifically directly in front of the guest. This is unsightly and, therefore, also disadvantageous because the electric cable lies in an area of water of condensation occurring.

SUMMARY OF THE INVENTION

Object is the provision of a container apparatus, with which the above mentioned drawback can be eliminated.

The inventive container apparatus is characterized, in that a horizontal receptacle supporting ring of the frame is provided with at least one supporting pin for the line projecting horizontally therefrom, which supporting pin is designed as a at the side open groove for a lateral hooking of the line and thus guiding the line towards the outside along the vertical outer contour of the receptacle and through the supporting pin.

By means of this inventive measure the line serving for the supply of energy is now led out of the container apparatus in a guided manner. Therefore it is possible to lead e.g. the electric cable from the outer side of the bottom of the receptacle along the vertically outer contour of the receptacle and then through the bearing pin. Now the electric cable does no longer lie loose between receptacle and tilting lid.

One embodiment of the subject of the invention is illustrated in the drawing.

BRIEF DESCRIPTION OF THE DRAWINGS

FIG. 3 is a top view in direction of the arrow A in FIG. 2, whereby the bearing pin with parts of the frame is illustrated.

DESCRIPTION OF THE PREFERRED EMBODIMENTS

Figure 1:
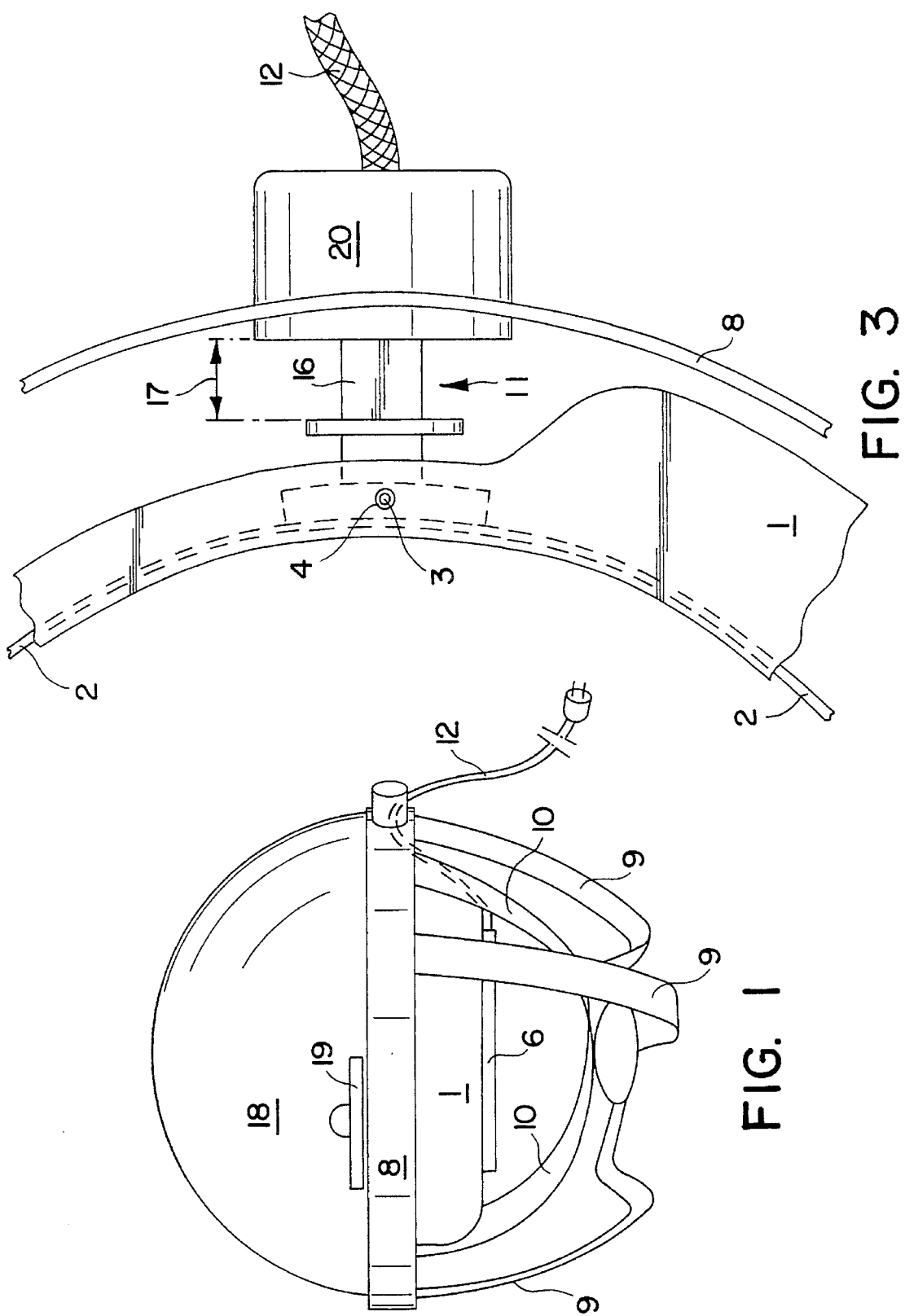
FIG. 1 is a perspective illustration of the container apparatus with a hemispherical tilting lid in the shut state.

The container apparatus for food shall be explained in the following as temperature holding apparatus, whereby the line for the supply of power is an electric cable. The container apparatus has a receptacle 1, which in the embodiment can serve as water receptacle, whereby this receptacle 1 is supported by a horizontal receptacle supporting ring 2, whereby for the correct position of the receptacle 1 in the supporting ring 2 at least one bolt 3 mounted to the supporting ring extends through a bore 4 of the receptacle 1. A heating device 6 is mounted in removable manner by means of four clamping screw bolts 7 to the outer side of the bottom 5 of the receptacle. In the illustrated embodiment, in which accordingly the receptacle 1 acts as water receptacle, a second, not illustrated receptacle is hung into the receptacle 1 such that food located in the second receptacle may be heated over the heated water. Therefore, in this case the receptacle 1 acts also for an indirect receipt of food. Besides the supporting ring 2 the frame of the apparatus has still further structural members 8, 9 and 10. The structural member 8 is designed such as is the case of the supporting ring 2 as horizontal ring and the structural members 9 form the legs of the apparatus and the structural member 10 describes a semicircular curve. The structural members 8 and 9 are welded together and the structural members 2 and 10 are bolted together. The supporting ring 2 is equipped with at least one supporting pin 11 for the line 12 (electric cable) projecting horizontally therefrom. In the drawings only one such supporting pin 11 is illustrated; at one embodiment, however, two supporting pins 11 were foreseen, located diametrically opposite of each other such that selectively the electric cable 12 could be led away from the apparatus at the left or the right hand side thereof.

Figure 2:
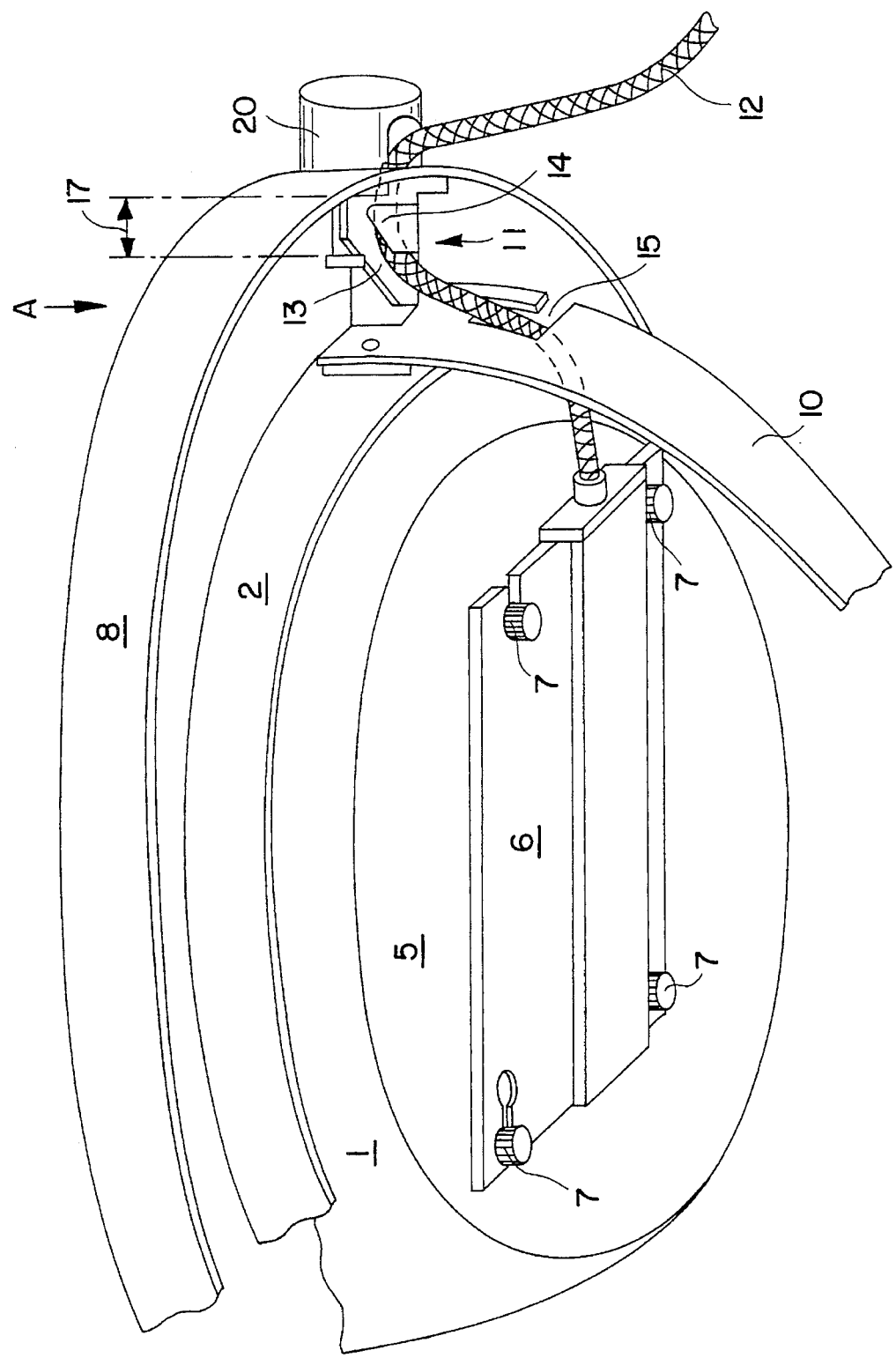
FIG. 2 is a perspective illustration obliquely from below onto the frame supporting the receptacle with the guide for the electric cable.

FIG. 2 illustrates that the supporting pin 11 is designed as a groove open at one side, whereby accordingly the supporting pin 11 has a recess 13. The supporting pin 11 includes, furthermore, a nose-shaped abutment 14 such that the electric cable 12 can be lifted over the nose-shaped abutment 14 into the recess 13. Furthermore, the member 10 of the frame includes a bayonet catch-like coulisse 15, into which the line 12 can be hung in at its portion between the bottom 5 of the receptacle and the supporting pin 11. FIG. 2 illustrates that by the design of the supporting pin 11 as laterally open groove the line 12 can be hung laterally into the supporting pin 11 such that the line 12 is led towards the outside along the vertical outer receptacle contour and through the supporting pin 11. The top view according to FIG. 3 illustrates that the supporting pin includes a sliding block-like portion 16. This portion 16 has the length 17 illustrated in FIGS. 2 and 3. This portion 16 can act in a specifically advantageous way as bearing axis for the tilting lid 18 of the apparatus, which in the illustrated embodiment is of a semihemispherical design. In the position illustrated in FIG. 1 the tilting lid 18 covers in one end position the second receptacle which receives the food directly and which is located thereunder and is not illustrated. The tilting lid 18 is equipped with a handle 19. The supporting pin 11 projects with a portion 20 from the ring 8 towards the outside, whereby the portion 20 can be designed in two parts, whereby the part located at the outside of the ring 8 can consist of a heat insulating plastic material.

Figure 5:
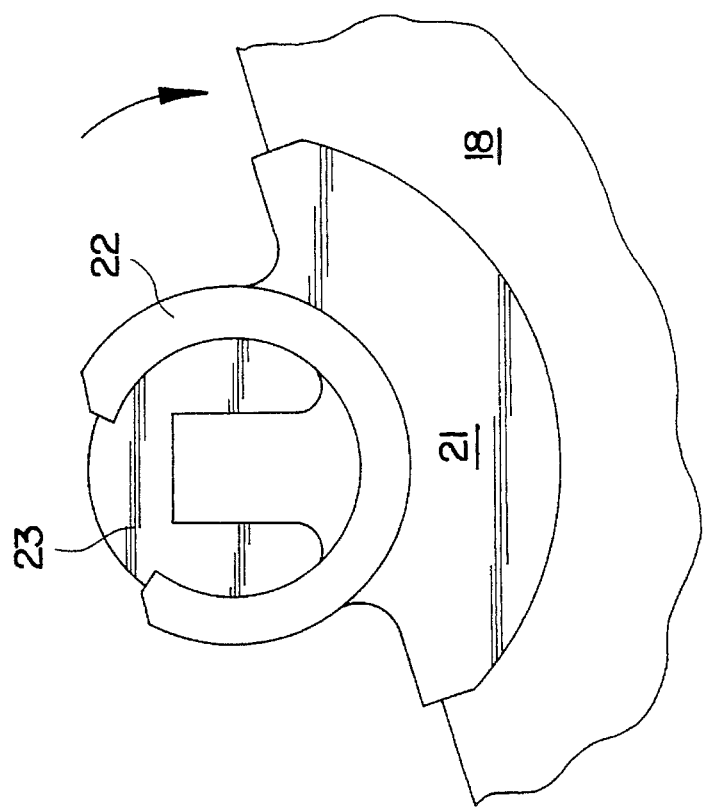
FIG. 5 illustrates the part of the tilting lid shown in FIG. 4, whereby the coulisse is in its shut state.
Figure 4:
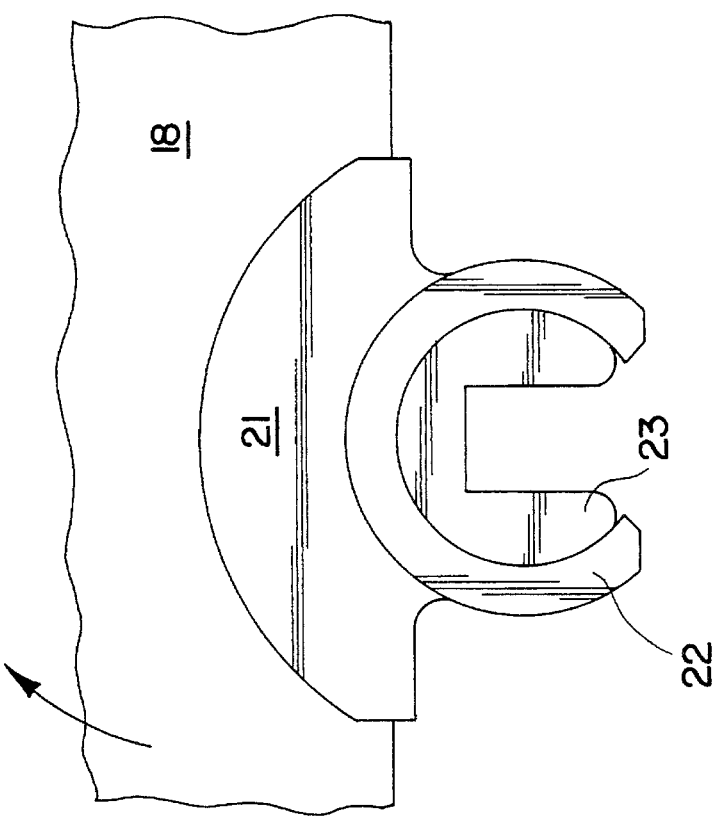
FIG. 4 illustrates a part of the tilting lid with a coulisse in the open state.

In FIGS. 4 and 5 the bearing points of the tilting lid 18 are illustrated, whereby the lid 18 includes at two diametrically opposite areas a respective fitting 21, which supports an open bearing bushing 22. A coulisse 23 is supported for rotation inside of this bearing bushing 22. When the coulisse 23 is in the position as illustrated in FIG. 4, the bearing bushing 22 is opened, and in the position of the coulisse 23 relative to the bearing bushing 22 the latter is shut. The coulisse 23 has thereby kept its spatial position, only the tilting lid 18 with fitting 21 and bearing bushing 22 have been pivoted from the position according to FIG. 4 by about 170° in direction of the arrow, i.e. clockwise. This pivoting movement is the movement for the pivoting of the lid 18 from its shut position into its open position. Therefore, in the position according to FIG. 5 the lid 8 is completely open, whereby the handle 19 of the lid 18 illustrated in FIG. 1 rests at a diametrically opposite point in a not illustrated fashion again on the ring 8. In the position of the lid according to FIG. 4 the lid with the coulisse 23 can be set vertically onto the portion 16 of the supporting pin 11. Accordingly, the portion 16 of the bearing pin 11 in form of a sliding block portion 16 is enclosed by the coulisse 23 such that the recess 13 of the supporting pin 11 has been closed in the area of the sliding pin shaped portion 16 of the coulisse 23. Therefore, when the lid 18 has been placed and closed, the electric cable 12 can no longer be taken out of the recess 13 of the bearing pin 11. In this shut position the lid 18 can, however, be lifted vertically at any time off the apparatus. When the lid 18 is placed on the supporting pin 11, it can now be opened completely (FIG. 5). Hereto the lid 18 has rotated together with its bearing bushing 22 relative to the coulisse 23, this means that the lid 18 has already been opened slightly, it no longer can be lifted off the rest of the apparatus.

The above description discloses clearly that the electric cable 12 is led away from the heating device 6 away and out of the apparatus such that when the lid 18 is open, the electric cable 12 does no longer lie between the heating device 6 and the lid 18 and does not run to the outside in a loosely hanging manner. At the same time the bearing pin 11 acting as a guide for the electric cable 12 can also be used for a supporting of the tilting lid 18.

However, also a different embodiment could be thought of, in which the supporting pin 11 acts only for a guiding of the cable 12, but not as supporting point for the lid 18. In such an embodiment the lid 18 could be provided simply with two laterally projecting bearing pins which are vertically set into vertical slits of the ring 8.

If the apparatus is not to be heated by the electric heating device 6 but rather with a heating plate, the heating device 6 can easily be removed from the screw bolts 7 and the cable 12 could be hung out of the groove 13 of the supporting pin 11 and the bayonet catch-like coulisse 15, too, such that the heating device 6 with the cable 12 can be removed from the apparatus in a simple manner.

In place of the cable 2 one also could place a gas line extending to the bottom 5 of the receptacle when a corresponding gas burner is mounted at the bottom 5 of the receptacle.

Although a preferred embodiment of the invention has been specifically illustrated and described herein, it is to be understood that minor variations may be made in the apparatus without departing from the spirit and scope of the invention, as defined the appended claims.

We claim:

1. Apparatus for food comprising a receptacle (1) supported by a frame (2, 8–10) intended for direct or indirect receipt of food, an electric line (12) for the supply of energy having one end mounted to a base (5) of the receptacle (1) for the transmittal of energy, a receptacle supporting ring (2) of the frame being provided with at least one supporting pin (11) for the electric line (12) projecting therefrom, said supporting pin (11) having a side opening groove (13) for laterally receiving and hooking of the electric line (12) thereby guiding the electric line (12) outboard of the receptacle (1) through the supporting pin (11).

2. Apparatus according to claim 1, characterized in that the receptacle (1) is intended to act as water receptacle, in which a second receptacle is insertable which is intended to receive the food, such that the receptacle (1) serves for an indirect receipt of the food.

3. Apparatus according to claim 1, characterized in that the electric line (12) extends to a heating device (6) mounted to the base (5) of a bottom of the receptacle (1).

4. Apparatus according to claim 1, characterized in that a frame part (10) of the frame (2, 8–10) extending in a substantially upward direction includes a bayonet slot (15) into which a portion of the electric line (12) between the base (5) of the receptacle (1) and the supporting pin (11) is hung.

5. Apparatus according to claim 1, characterized in that the supporting pin (11) includes a sliding block shaped portion (16) which acts as bearing axis for a pivotable lid (18) of the receptacle (1) with said lid (18) being pivoted between two positions respectively opening and closing said receptacle (1).

6. Apparatus according to claim 5, characterized in that when the pivotable lid (18) is in place the side opening groove (13) of the supporting pin (11) is enclosed by a coulisse (23) of the pivotable lid (18) whereby the side opening groove (13) of the supporting pin (11) is closed by the coulisse (23) at the area of the sliding block shaped portion (16).

7. Apparatus according to claim 6, characterized in that the pivotable lid (18) includes an open bearing bushing (22) for the coulisse (23) supported therein for rotation whereby rotation of the coulisse (23) in the open bearing bushing 22 will open or close the coulisse (23).

8. Apparatus according to claim 6, characterized in that the coulisse (23) consists of a plastic material.

9. Apparatus for food comprising a receptacle (1) disposed generally within a ring (8), substantially diametrically disposed means for pivoting said receptacle (1) relative to said ring (8), means (6) for heating said receptacle (1), an electric line (12) connected to said heating means (6), at least one of said pivoting means including first and second relatively pivoting portions (22, 23) carried one each by said receptacle (1) and said ring (8), said first and second pivoting portions (22, 23) being mounted for relative pivoting about a generally common axis of rotation, each of said pivoting portions (22, 23) including a substantially radially outwardly opening groove, one (23) of said pivoting portions being generally housed within another (22) of said portions, said radially outwardly opening grooves being substantially aligned in one position whereby said electric line (12) can be introduced into and removed from said grooves, said radially outwardly opening grooves being misaligned in a second position whereby an innermost of said radially outwardly opening groove is closed by said another (22) portion, and a portion of said electric line (12) is housed in said closed grooves.

10. The apparatus as defined in claim 9 wherein a frame portion (10) includes a substantially bayonet slot (15) and said electric line (12) passes through said bayonet slot (15).

* * * * *